United States Patent [19]

Whitaker

[11] Patent Number: 5,238,284
[45] Date of Patent: Aug. 24, 1993

[54] CARGO AREA COVER AND LOAD SUPPORT

[75] Inventor: Daniel Whitaker, Santa Ana, Calif.

[73] Assignee: Performance Marketing, Santa Ana, Calif.

[21] Appl. No.: 848,824

[22] Filed: Mar. 10, 1992

[51] Int. Cl.⁵ .............................................. B60R 7/00
[52] U.S. Cl. .................................................. 296/37.16
[58] Field of Search ............................. 296/37.16, 100

[56] References Cited

U.S. PATENT DOCUMENTS

| | | | |
|---|---|---|---|
| 4,262,955 | 4/1981 | Duda | 296/37.16 X |
| 4,480,675 | 11/1984 | Berkemeier | 296/37.16 X |
| 4,671,557 | 6/1987 | Lemp | 296/37.16 |
| 5,011,208 | 4/1991 | Lewallen | 296/37.16 |

FOREIGN PATENT DOCUMENTS

| | | | |
|---|---|---|---|
| 57537 | 5/1981 | Japan | 296/37.16 |
| 194164 | 11/1982 | Japan | 296/37.16 |
| 149838 | 8/1984 | Japan | 296/37.16 |
| 2173456 | 10/1986 | United Kingdom | 296/37.16 |

Primary Examiner—David M. Mitchell
Assistant Examiner—Gary C. Hoge
Attorney, Agent, or Firm—Stetina & Brunda

[57] ABSTRACT

An automobile cargo area cover has a sheet structure suitable to cover the cargo area, a generally rigid panel secured to the rear end of the sheet structure, rigid structure secured to the forward end of the sheet structure, a central elongate rigid structure extending across the width of the cover generally centrally thereof, and a plurality of semi-rigid, elongate structures extending substantially from the central rigid structure to the forward and rear generally rigid structures, respectively.

4 Claims, 1 Drawing Sheet

CARGO AREA COVER AND LOAD SUPPORT

BACKGROUND OF THE INVENTION

This invention relates to ground vehicles generally and specifically to automobiles referred to variously as sports vans, sports wagons and station wagons.

Covers for visible cargo spaces in automobiles are well-known. Many automobiles, especially smaller sports cars, are equipped with a fabric or plastic cover to prevent persons on the outside from viewing through the car window the contents of the open cargo space behind the seat at the rear of the vehicles. Such covers serve a limited purpose, however, and do not permit partially closing of the cargo space or carrying articles on the cover.

It is an object of this invention to provide a cargo space cover that will cover the cargo space in whole or in part and is also capable of carrying articles on top of the cover.

SUMMARY OF THE INVENTION

This invention is a new and highly convenient and useful cargo cover for exposed cargo areas in an automobile having a seat with a rear panel, opposed side panels and an inside rear gate panel. The cover is made up of sheet structure, such as fabric or fabric reinforced plastic. The sheet material is of a size suitable for covering substantially all of the cargo area of an automobile. A generally rigid is structure secured to rear end of the sheet structure. This generally rigid structure is preferably in the form of a panel of thick, bonded wood fibers. Means are provided for securing the rear generally rigid structure to the inside panel of the rear gate of the automobile. A rigid structure, such as a pipe or tube, polyvinyl chloride pipe being convenient, is secured to the forward end of the sheet structure. Means for also provided for securing the rigid forward structure to the rear panel of the automobile seat. A central elongate rigid structure extends across the width of the cover generally centrally thereof in a tube formed of the two layers of sheet materials. Means for securing the respective ends of the elongate central rigid structure to the respective sidewalls of the automobile cargo space are provided. Conveniently the securing means comprise D-rings on the cover and hooks on the automobile. A plurality of semi-rigid, elongate structures extending substantially from the central rigid structure to the rear generally rigid structure and, in like manner, a plurality of semi-rigid, elongate structures extending substantially from the central rigid structure to the forward rigid structure. These semi-rigid, elongate structures, preferably generally U-shaped elongate structures formed of plastic or light spring metal, are spaced from each other across the width of the cover to provide a substantially rigid support surface.

DESCRIPTION OF THE PREFERRED EMBODIMENTS

Specific structures are described to illustrate the manner of making and using this invention; however, many other structures can be used in carrying out the concept of the invention.

Figure 1:
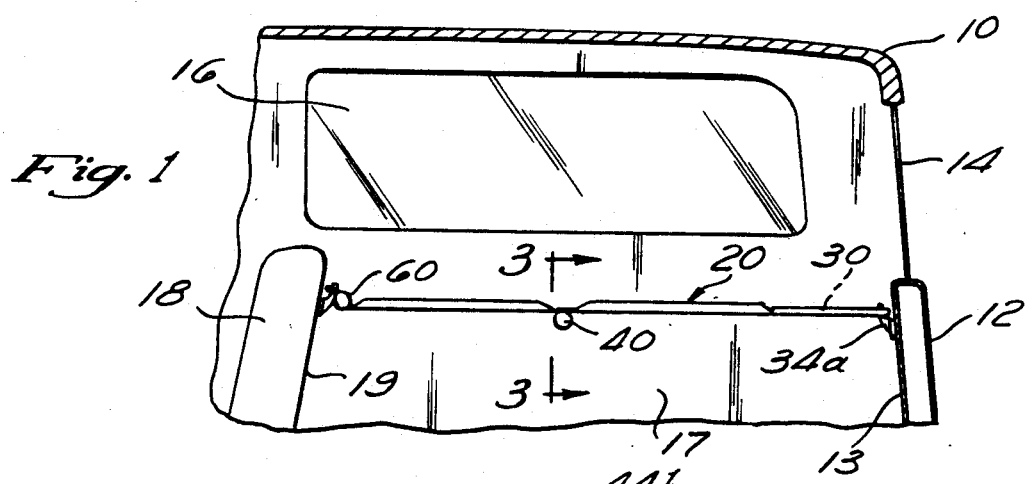
FIG. 1 depicts, schematically and in cross-section, the upper rear portion of a sports van with the cargo cover of this invention installed therein.
Figure 2:
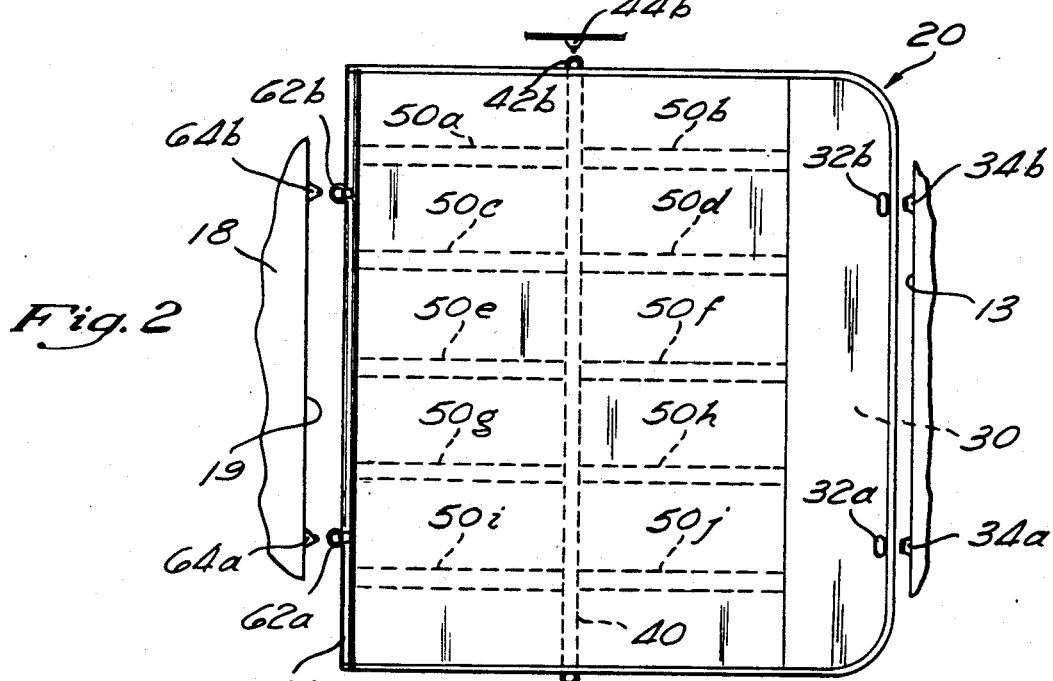
FIG. 2 is a top plan view of the cargo cover of this invention and, in partial exploded view, the hooks for connecting it to the vehicle.

Referring first to FIG. 1, the upper rear portion of a sports van 10 is shown, The rear gate exterior wall is shown at 12 and the interior wall of the rear gate is shown at 13. The rear window is depicted at 14 and one of two side windows is shown at 16, the other window (not shown) being a mirror image in the other side of the vehicle. A sidewall of the cargo space is depicted at 17, there being an opposed side wall on the other side of the cargo space. The rear seat 18 is depicted, the rear panel of the rear seat being depicted at 19. The cargo cover 20 is shown secured over the cargo area.

Reference is now made to FIGS. 2, 3, 4 and 5. The cargo cover 20 comprises and upper layer 22 of fabric or plastic film or sheet material or a fiber reinforced plastic sheet and a bottom layer 24 of the same material or a different material. The layers 22 and 24 generally emcompass all of the structure of the cargo cover except portions that extend for securing the cargo cover in the vehicle.

Figure 4:
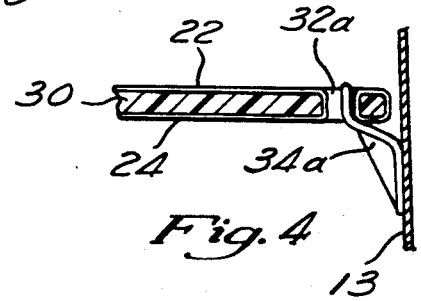
FIG. 4 is an enlarged cross-sectional view of a portion of the rigid rear section of the cargo cover of this invention attached to a hook on the rear gate of the vehicle.
Figure 5:
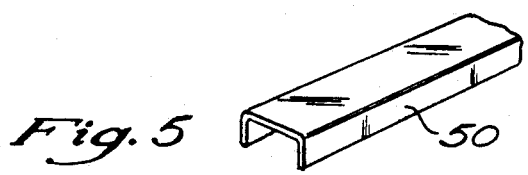
FIG. 5 is a perspective view of one of the longitudinal stiffeners that comprises part of the cargo cover of this invention.

The cargo cover comprises a generally rigid panel 30, see FIG. 4, encased in the fabric or plastic sheet material. Two or more apertures 32a and 32b are formed through the panel 30. Openings in the sheet material with suitable grommets complete the formation of apertures for connecting the rear edge of the cargo cover to hooks 34a and 34b that are secured by screws, or otherwise, to the inside panel of the rear gate, generally as shown in FIG. 4. The panel may be formed of plastic or of bonded wood fibers, i.e., thick, rigid fiberboard or of any other material.

Figure 3:
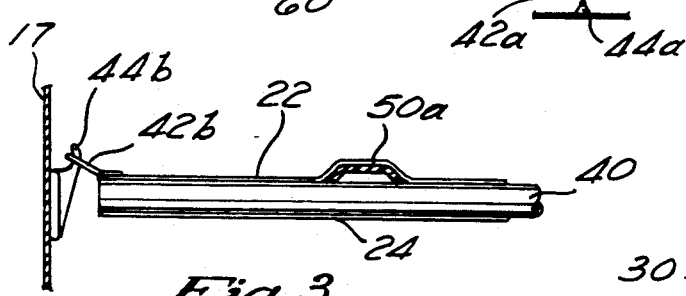
FIG. 3 is an enlarged cross-sectional view of a portion of the central support bar connected to the sidewall of the cargo area of the vehicle.

The cargo cover further comprises a central support bar 40 that extends from side to side of the cargo area. D-rings 42a and 42b are secured to the ends of the central support bar 40 and engage hooks 44a and 44b that are attached by screws, or otherwise, to the side walls of the vehicle cargo area as depicted in FIG. 3. The central support bar is conveniently contained in a loop, see FIG. 1, of a double layer of fabric, etc., i.e., of the layers 22 and 24. The bar itself may be of any rigid or semi-rigid material. Metal or plastic tubing, for example may be used. A light, strong metal such as aluminum is quite suitable for forming the central support bar. The D-rings may be welded or otherwise secured to the ends of the bar.

The fabric or sheet material layers also form a plurality of tubes extending longitudinally of the vehicle when the cargo cover is installed that encase a plurality of semi-rigid stiffeners 50a–50i. One set of such stiffeners is in the rear half of the cover, to the rear of the central support bar, and one set is in front of the central support bar. The semi-rigid stiffeners may be made of spring metal or plastic. Polypropylene and high density polyethylene extruded in a generally U-shaped configuration, see FIG. 5, having short legs and a wide bottom, form very satisfactory semi-rigid stiffeners. The portion of the cover between the central bar and either end is generally rigid; however, upon exertion of modest force, the stiffener flattens and bends. This is especially useful in permitting access to only a portion of the covered cargo area.

The forward end of the cargo cover comprises a tube formed of the fabric or sheet material through which a forward rod 60 extends. Tabs and D-rings 62a and 62b are sewn or otherwise connected to the sheet material and/or directly to the forward rod 60 for being received on hooks 64a and 64b that are screwed or otherwise secured to the rear of the seat.

The cargo cover can be installed, as shown in FIG. 1, to cover the entire cargo area. The provision of rigid structures at the forward end, rear end and generally in the central area along with longitudinal stiffeners permits the user to put light articles on the top of the cover.

Either the front portion or the rear portion may be installed, leaving the other loose, the loose end being used to cover part of the cargo area vertically or simply thrown back over the installed end. This permits either the front or the rear of the cargo area to be covered independently of one another, as well as the covering of the entire cargo area.

In all installed configuration, light cargo, e.g. a limited number of light articles, can be carried on the top of the cargo cover.

This invention, thus, provides the covering that is desirable to prevent viewing of the cargo area or sun damage to its contents, etc., permits carrying of cargo above as well as below the cover, permits either the front portion or the back portion to be covered, and permits convenient access to a portion of the covered cargo area.

INDUSTRIAL APPLICATION

This invention is useful in the automobile and automobile accessory industries.

What is claimed is:

1. A cargo cover for exposed cargo areas in an automobile having a seat with a rear panel, opposed side panels and an inside rear gate panel comprising:
   sheet structure for covering substantially all of the cargo area of an automobile;
   a generally rigid structure secured to rear end of the sheet structure;
   means for securing the rear generally rigid structure to the inside panel of the rear gate of the automobile;
   rigid structure secured to the forward end of the sheet structure;
   means for securing the rigid forward structure to the rear panel of the automobile seat;
   a central elongate rigid structure extending across the width of the cover generally centrally thereof;
   means for securing the respective ends of the elongate central rigid structure to the respective sidewalls of the automobile cargo space;
   a plurality of first semi-rigid, elongate structures disposed intermediate the sides of the sheet and extending across said sheet structure substantially from the central rigid structure to the rear generally rigid structure;
   a plurality of second semi-rigid, elongate structures disposed intermediate the sides of the sheet and extending across said sheet structure substantially from the central rigid structure to the forward rigid structure;
   said semi-rigid, elongate structures being spaced from each other across the width of the cover; and
   wherein said first and second semi-rigid, elongate structures provide a substantially rigid support surface.

2. The cargo cover of claim 1 wherein the semi-rigid, elongate structures are generally U-shaped elongate structures having the opening formed therein oriented downwardly.

3. The cargo cover of claim 1 wherein said generally rigid structure secured to the end of the sheet structure comprises a panel and said rigid structure secured to the forward end of the sheet structure comprises a bar.

4. The cargo cover of claim 1 wherein that portion of the sheet structure intermediate the central elongate rigid structure and the rigid structure secured to the forward end of the sheet structure defines a first cover portion and that portion of the sheet structure intermediate the central elongate rigid structure and the generally rigid structure secured to the rear end of the sheet structure defines a second cover portion, the first and second cover portions being independently positionable to cover either the front of the cargo area, rear of the cargo area, or entire cargo area, as desired.

* * * * *